United States Patent
Omata et al.

(10) Patent No.: US 8,872,963 B2
(45) Date of Patent: Oct. 28, 2014

(54) IMAGING APPARATUS AND IMAGING METHOD

(71) Applicant: Olympus Corporation, Tokyo (JP)

(72) Inventors: Yoshinobu Omata, Hachioji (JP);
Kazuya Kobayashi, Yokohama (JP);
Kazumasa Kunugi, Hachioji (JP);
Yukie Yamazaki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/162,502

(22) Filed: Jan. 23, 2014

(65) Prior Publication Data
US 2014/0132824 A1    May 15, 2014

Related U.S. Application Data

(63) Continuation of application No. PCT/JP2012/074183, filed on Sep. 21, 2012.

(30) Foreign Application Priority Data

Nov. 25, 2011    (JP) .................................. 2011-257644

(51) Int. Cl.
G03B 13/00    (2006.01)
H04N 5/232    (2006.01)
G02B 7/38    (2006.01)
G03B 13/36    (2006.01)

(52) U.S. Cl.
CPC .............. H04N 5/23212 (2013.01); G02B 7/38 (2013.01); G03B 13/36 (2013.01)
USPC ............ 348/356; 348/349; 348/354; 348/355

(58) Field of Classification Search
CPC .......... H04N 5/23212; H04N 5/23293; H04N 5/2356; G03B 13/36; G03B 3/10; G03B 13/18; G03B 13/32; G03B 3/00
USPC ................................................ 348/345–357
See application file for complete search history.

(56) References Cited

U.S. PATENT DOCUMENTS 6,356,307 B2 *    3/2002    Ohkawara et al. ............ 348/360
6,624,851 B1 *    9/2003    Okajima et al. .............. 348/347
(Continued)

FOREIGN PATENT DOCUMENTS

JP    H01-268366    11/1989
JP    2003-140032    5/2003
(Continued)

OTHER PUBLICATIONS

International Search Report for PCT/JP2012/074183 (PCT/ISA/210), dated Dec. 18, 2012 (2 pgs.).
(Continued)

*Primary Examiner* — Chia-Wei A Chen
(74) *Attorney, Agent, or Firm* — John C. Pokotylo; Straub & Pokotylo

(57) ABSTRACT

A lens drive unit drives a focus lens. An imaging element obtains an image signal. An evaluation value calculation unit calculates an AF evaluation value from the image signal read out based on an interlace system. A determination unit determines whether the continuous AF evaluation values have a distribution of continuous increases and decreases. If the AF evaluation values are determined to have the distribution of continuous increases and decreases, an in-focus position calculation unit calculates an in-focus position by obtaining an interpolation curve from an intermediate value of the AF evaluation values adjacent to each other, otherwise, calculates the in-focus position by obtaining an interpolation curve of the AF evaluation value. A control unit drives the focus lens to the in-focus position.

6 Claims, 4 Drawing Sheets

(56) References Cited

U.S. PATENT DOCUMENTS

| | | | |
|---|---|---|---|
| 7,391,462 B2* | 6/2008 | Ike | 348/347 |
| 7,394,943 B2* | 7/2008 | Kinney et al. | 382/255 |
| 7,515,201 B2* | 4/2009 | Nakahara | 348/354 |
| 7,545,432 B2* | 6/2009 | Lee | 348/349 |
| 7,616,254 B2* | 11/2009 | Wong et al. | 348/349 |
| 2004/0095504 A1* | 5/2004 | Yasuda | 348/345 |
| 2004/0227843 A1* | 11/2004 | Watanabe | 348/354 |
| 2005/0195310 A1* | 9/2005 | Yajima et al. | 348/345 |
| 2006/0028574 A1* | 2/2006 | Lee | 348/345 |
| 2007/0132877 A1* | 6/2007 | Bok et al. | 348/345 |
| 2008/0124068 A1* | 5/2008 | Kwon et al. | 396/127 |
| 2008/0180563 A1* | 7/2008 | Hsu | 348/349 |
| 2008/0211957 A1* | 9/2008 | Ishikawa | 348/345 |
| 2008/0267601 A1* | 10/2008 | Kobayashi | 396/91 |
| 2009/0073304 A1* | 3/2009 | Kumagai et al. | 348/345 |
| 2009/0201410 A1* | 8/2009 | Nishiguchi et al. | 348/345 |
| 2010/0085470 A1* | 4/2010 | Tsubusaki | 348/345 |
| 2010/0202666 A1* | 8/2010 | Ren et al. | 382/117 |
| 2010/0225800 A1* | 9/2010 | Lee | 348/347 |
| 2010/0245657 A1* | 9/2010 | Adachi et al. | 348/349 |
| 2011/0019067 A1* | 1/2011 | Matsumoto et al. | 348/346 |
| 2011/0134312 A1* | 6/2011 | Tay | 348/349 |
| 2011/0273610 A1* | 11/2011 | Tay | 348/345 |
| 2011/0298964 A1* | 12/2011 | Hikida | 348/345 |
| 2012/0008038 A1* | 1/2012 | Yen et al. | 348/349 |

FOREIGN PATENT DOCUMENTS

| | | |
|---|---|---|
| JP | 2005-221973 | 8/2005 |
| JP | 2006-217668 | 8/2006 |
| JP | 2006-308884 | 11/2006 |

OTHER PUBLICATIONS

International Preliminary Report of Patentability for International Patent Application No. PCT/JP2012/074183 (6 pgs.).

* cited by examiner

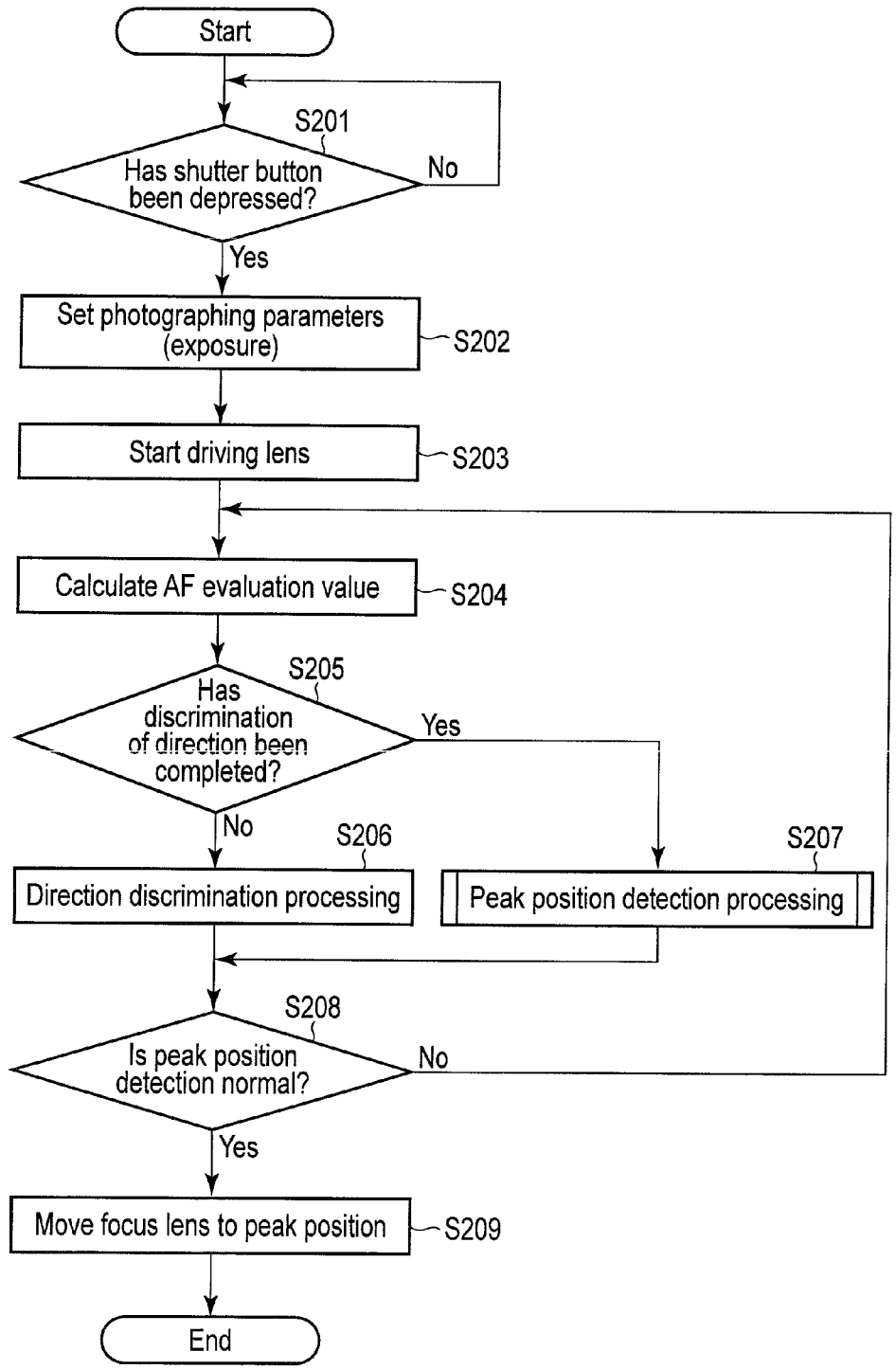
F I G. 2

IMAGING APPARATUS AND IMAGING METHOD

CROSS-REFERENCE TO RELATED APPLICATIONS

This application is a Continuation Application of PCT Application No. PCT/JP2012/074183, filed Sep. 21, 2012 and based upon and claiming the benefit of priority from the prior Japanese Patent Application No. 2011-257644, filed Nov. 25, 2011, the entire contents of which are incorporated herein by reference.

BACKGROUND OF THE INVENTION

1. Field of the Invention

The present invention relates to an imaging apparatus including an imaging element that reads out an image signal based on an interlace system and an imaging method using such an imaging apparatus.

2. Description of the Related Art

In recent years, the spread of digital cameras is admirable, and their performance is evolving on a daily basis. Further, recent digital cameras have various functions, whereby a photographer can take high-quality pictures irrespective of his/her skill. An autofocus function is one of these functions. To avoid missing a photo opportunity, it is necessary to shorten a time required for detecting an in-focus position as much as possible when the autofocus function is used.

Autofocus systems can be roughly classified into an active system and a passive system.

The active system is a system that irradiates a subject with auxiliary light such as an infrared ray from a camera, detects reflected light of this auxiliary light from the subject to measure a distance from the camera to the subject, and drives a focus lens in accordance with this distance. This active system is used in some digital video cameras.

The passive system is a system that measures a distance based on the luminous flux from a subject that has passed through an imaging lens, and it is divided into a phase difference system and a contrast system. The phase difference system is a system that divides a pupil of the imaging lens into a pair of regions and detects a relative positional change of a pair of images formed by the luminous flux that passes through the divided pupil regions to detect an in-focus position, and this system is often used in digital single-lens reflex cameras. The contrast system (which will be referred to as contrast AF hereinafter) is a system that is often used in compact digital cameras, and reads out an image signal from an imaging element while moving a position of a focus lens along an optical axis direction, calculates an AF evaluation value used for evaluating contrast from the image signal obtained in accordance with each frame, detects a maximum (peak) value of the AF evaluation values, and determines a focus lens position where the peak value of the AF evaluation values can be obtained as an in-focus position.

Here, as one of methods for detecting an in-focus position at a high speed in the contrast AF, increasing a frame rate for reading out an image signal from the imaging element can be considered. As one of systems for increasing a frame rate for reading, there is an interlace system. The interlace system is a system that divides one frame into a plurality of (e.g., two which are an Odd (odd number) field and an Even (even number) field) fields and reads image signals from different pixels on the imaging element in the respective fields. According to such an interlace system, the frame rate for reading from the imaging element can be increased.

When the interlace system is adopted as a system for reading an image signal from an imaging element, a frame rate for reading can be increased, but an AF accuracy is reduced. This reduction in AF accuracy will now be described with reference to FIG. 6. FIG. 6 shows an example of two-field reading, and C1 and C3 represent AF evaluation values of an Odd (odd number) field. Furthermore, C2 and C4 represent AF evaluation values of an Even (even number) field. In the case of reading an image signal based on the interlace system, AF evaluation value calculation areas do not spatially coincide with each other in the Odd field and the Even field. Therefore, even if focus lens positions are equal to each other, an AF evaluation value calculated in the Odd field may be possibly different from an AF evaluation field calculated in the Even field depending on a photographic scene.

As described above, in the contrast AF, a peak value of the AF valuation values is detected. Here, when a drive speed of a focus lens increases, an interval for acquiring each AF evaluation value widens, and a possibility that an AF evaluation value at a true peak position cannot be obtained rises. Therefore, to detect the true peak position, an interpolation calculation is required. For example, in FIG. 6, C3 is determined as a temporary peak position of the AF evaluation values. In the interpolation calculation, an interpolation curve running through three AF evaluation values C2, C3, and C4 at three points including this temporary peak position C3 is calculated, and a maximal value of this interpolation curve is obtained, whereby a peak position is calculated.

Here, as described above, since how each AF evaluation value differs in the Odd field may highly possibly differ from that in the Even field, a peak position different from the true peak position may be calculated by the interpolation calculation. When a wrong peak position is calculated, since a position deviating from the true in-focus position is determined as the in-focus position and a focus lens is driven, an AF accuracy is lowered.

In regard to a reduction in AF accuracy in the contrast AF when such an interlace system is used, according to Jpn. Pat. Appln. KOKAI Publication No. Hei 1-268366, a high-pass component in an image signal obtained from an imaging element is acquired as a first evaluation value in accordance with each field, an evaluation value obtained by adding the acquired first evaluation values every two continuous fields is determined as a second evaluation value, and a position of a focus lens is adjusted so that this second evaluation value can be maximum (maximal).

Further, as a suggestion similar to Jpn. Pat. Appln. KOKAI Publication No. Hei 1-268366, in Jpn. Pat. Appln. KOKAI Publication No. 2003-140032, image signals in fields are acquired at respective focus lens positions, the image signals of the fields are added up, an AF evaluation value is calculated from the added image signal, and the contrast AF is carried out. In Jpn. Pat. Appln. KOKAI Publication No. 2003-140032, an in-focus position can be detected by using the added image signal even if a subject has low luminance.

BRIEF SUMMARY OF THE INVENTION

An imaging apparatus according to a first aspect of the invention comprises a lens drive unit configured to drive a focus lens; an imaging element configured to image a subject through the focus lens to obtain an image signal; an evaluation value calculation unit configured to read out the image signal obtained by the imaging element based on an interlace system and to calculate an AF evaluation value from the image signal in each field read out based on the interlace system; a determination unit configured to determine whether the continuous AF evaluation values have a distribution of continuous increases and decreases; an in-focus position calculation unit configured to perform a first interpolation calculation for obtaining an interpolation curve from an intermediate value of the AF evaluation values adjacent to each other and calculating an in-focus position when the AF evaluation values are determined to have the distribution of continuous increases and decreases, and performs a second interpolation calculation for obtaining an interpolation curve of the AF evaluation value and calculating an in-focus position when the AF evaluation values are determined to not have the distribution of continuous increases and decreases; and a control unit configured to control the lens drive unit to drive the focus lens to the in-focus position.

An imaging method according to a second aspect of the invention comprises using a lens drive unit to drive a focus lens; using an imaging element to image a subject through the focus lens to obtain an image signal; using an evaluation value calculation unit to read out the image signal obtained by the imaging element based on an interlace system and calculate an AF evaluation value from the image signal in each field read out based on the interlace; using a determination unit to determine whether the continuous AF evaluation values have a distribution of continuous increases and decreases; using an in-focus position calculation unit to perform a first interpolation calculation for obtaining an interpolation curve from an intermediate value of the AF evaluation values adjacent to each other and calculating an in-focus position when the AF evaluation values are determined to have the distribution of continuous increases and decreases, and to perform a second interpolation calculation for obtaining an interpolation curve of the AF evaluation values and calculating an in-focus position when the AF evaluation values are determined to not have the distribution; and using a control unit to control the lens drive unit to drive the focus lens to the in-focus position.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart showing an extracted operation of automatic focus adjustment (AF) of the imaging apparatus according to an embodiment of the present invention;

DETAILED DESCRIPTION OF THE INVENTION

An embodiment according to the present invention will now be described hereinafter with reference to the drawings.

Figure 1:
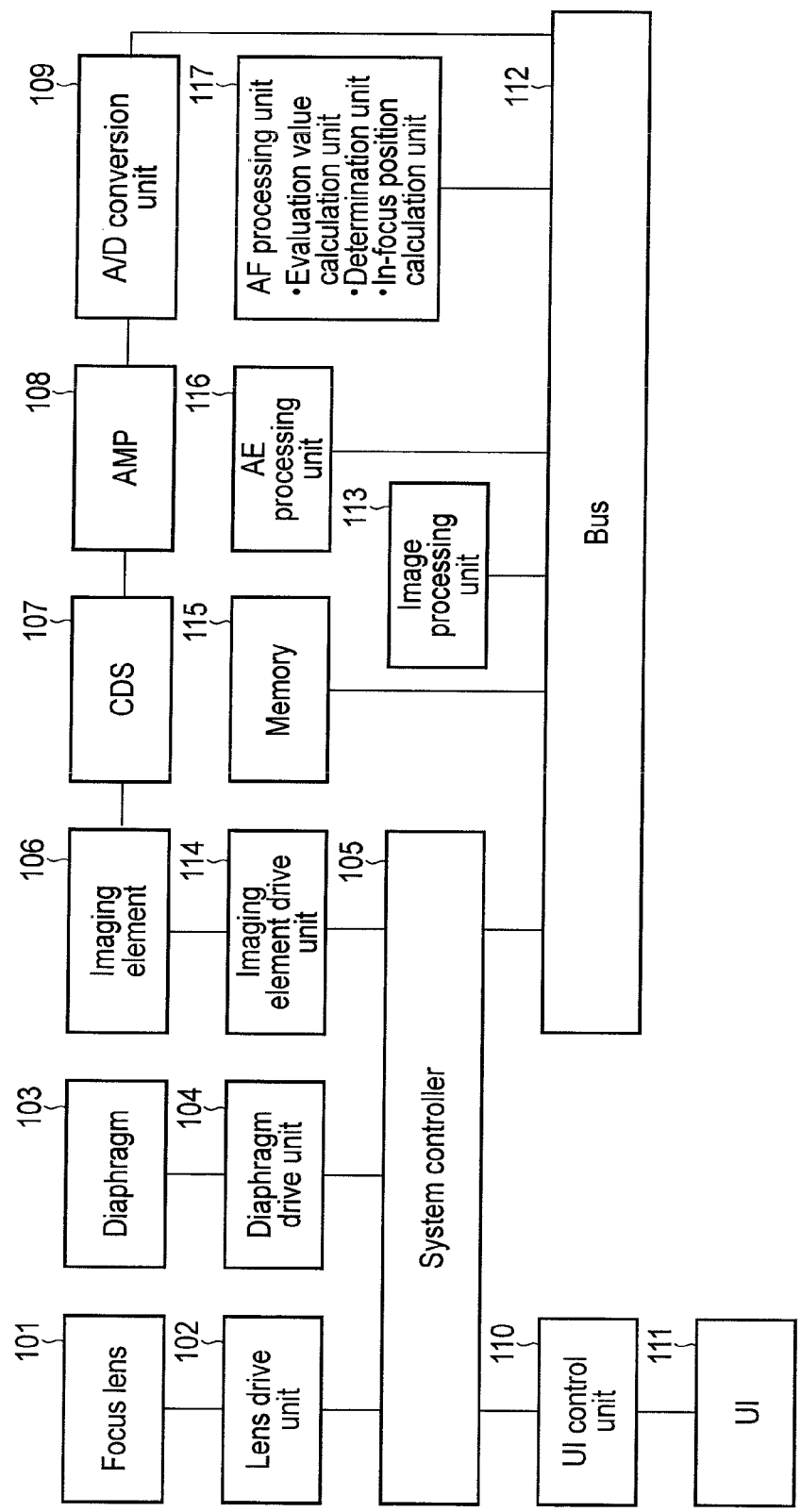
FIG. 1 is a block diagram showing a configuration of an imaging apparatus according to an embodiment of the present invention.

FIG. 1 is a block diagram showing a configuration of an imaging apparatus according to an embodiment of the present invention. Here, as the imaging apparatus in this embodiment, it is possible to apply various kinds of imaging apparatuses each having an autofocus function based on a contrast system. It is to be noted that, as an example of the imaging apparatus in this embodiment, a digital camera will be described.

An imaging apparatus (a digital camera) shown in FIG. 1 includes a focus lens 101, a lens drive unit 102, a diaphragm 103, a diaphragm drive unit 104, a system controller 105, an imaging element 106, a correlated double sampling (CDS) circuit 107, an amplification circuit (AMP) 108, an analog/digital (A/D) conversion unit 109, a user interface (UI) control unit 110, an UI 111, a bus 112, an image processing unit 113, an imaging element drive unit 114, a memory 115, an AE processing unit 116, and an AF processing unit 117. Further, although not shown in FIG. 1, the imaging apparatus may include a display unit configured to display images or a recording unit configured to record images.

The focus lens 101 forms an image of the luminous flux from a non-illustrated subject on the imaging element 106. This focus lens 101 is configured to be driven in an optical axis direction. When the focus lens 101 is driven, an in-focus state of the focus lens 101 relative to the subject varies. Here, the focus lens 101 may be used as a combination with any other lens such as a zoom lens.

The lens drive unit 102 includes a motor and a motor driver. This lens drive unit 102 receives an instruction from the system controller 105 and drives the focus lens 101 in its optical axis direction.

The diaphragm 103 is configured to be openable/closable and limits the luminous flux entering the imaging element 106 through the focus lens 101. An amount of exposure of the imaging element 106 can be controlled based on a diameter of the diaphragm 103.

The diaphragm drive unit 104 has a motor and a motor driver. The diaphragm drive unit 104 receives an instruction from the system controller 105 and drives the diaphragm 103.

The system controller 105 controls an operation of each unit in the digital camera. The system controller 105 in this embodiment has a function as a control unit, and it controls, e.g., the lens drive unit 102 to control a position of the focus lens 101. At this time, the system controller 105 drives the focus lens 101 to an in-focus position in accordance with lens position data output from the AF processing unit 117. Furthermore, the system controller 105 controls the diaphragm drive unit 104 to further control a diameter of the diaphragm 103, or it controls the imaging element drive unit 114 to also control the read timing for an image signal from the imaging element 106.

The imaging element 106 has a photoelectric surface on which many light receiving elements are arranged as pixels in a matrix form. Moreover, color filters associated with, e.g., respective colors of RGB are arranged in a mosaic form on the photoelectric surface of the imaging element 106. In the imaging element 106 having such a configuration, the luminous flux from the subject that has passed through the focus lens 101 is converted into an electric charge on the photoelectric surface. An exposure time of each pixel is controlled by an electronic shutter drive signal supplied from the imaging element drive unit 114. The electric charge obtained by each pixel in the imaging element 106 is read out as an image signal in synchronization with a vertical transfer clock signal and a horizontal transfer clock signal supplied from the imaging element drive unit 114.

The CDS circuit 107 carries out correlated double sampling (CDS) for removing dark current noise in the image signal output from the imaging element 106. The AMP 108 performs gain adjustment of the image signal output from the CDS circuit 107. The A/D conversion unit 109 converts the analog image signal output from the AMP 108 into digital image data.

The UI control unit 110 transmits input information associated with input from the user interface (UI 111) by a user to the system controller 105. The UI 111 corresponds to various kinds of interfaces, each of which is configured to be operated by a user, such as a shutter button, a power supply button, a zoom button, or a touch panel. For example, when the shutter button is half-depressed, a photographing preparation operation start instruction is issued to the system controller 105 through the UI control unit 110. Moreover, when the shutter button is full-depressed, a photographing operation start instruction is issued to the system controller 105 through the UI control unit 110.

The bus 112 is a transfer path through which various kinds of data generated in the digital camera are transferred.

The image processing unit 113 carries out image processing such as coloring to image data written in the memory 115. In the case of the imaging element 106 including the above-described color filters (color filters in a primary color type Bayer array) associated with respective colors of RGB, an image signal output from each pixel has information of any one of R, G, and B alone. For example, to display an image associated with such an image signal, coloring processing is required. The image processing unit 113 generates three-component image data from single-component image data by interpolation processing as coloring processing. The three-component image data means image data that each pixel has information of RGB. Further, the image processing unit 113 also performs processing for generating a luminous signal and a color difference signal from color image data, white balance correction processing, gamma correction processing, contrast correction processing, contour enhancement processing, and the like.

The imaging element drive unit 114 supplies an electronic shutter drive signal to the imaging element 106 in accordance with control of the system controller 105. Additionally, the imaging element drive unit 114 also has a read function and supplies a vertical transfer clock signal and a horizontal transfer clock signal to the imaging element 106 in accordance with control of the system controller 105. Here, the imaging element 106 in this embodiment reads out an image signal based on the interlace system. For example, when reading of image signals from the imaging element 106 is two-field reading, image signals from pixels in odd-numbered rows of the imaging element 106 are sequentially read out every time each horizontal transfer clock signal is supplied in the Odd field. Further, in the Even field, image signals from pixels in even-numbered rows of the imaging element 106 are sequentially read out every time each horizontal transfer clock signal is supplied.

The memory 115 is a work memory that temporarily stores image data obtained by the A/D conversion unit 109, image data processed by the image processing unit 113, data used in the AE processing unit 116 and the AF processing unit 117, and other data. The memory 115 in this embodiment also stores AF evaluation values of fields obtained by the AF processing unit 117. In the following description, it is assumed that the memory 115 stores AF evaluation values of at least four fields.

The AE processing unit 116 calculates subject luminance from image data written in the memory 115. The AE processing unit 116 also sets photographing parameters in accordance with the calculated subject luminance. The photographing parameters include exposure conditions such as an aperture which is a value for setting a diameter of the diaphragm 103, a shutter speed which is used for setting an exposure time of the imaging element 106, and others.

The AF processing unit 117 as an evaluation value calculation unit calculates each AF evaluation value from image data by using area information set by the UI control unit 110. The AF evaluation value can be obtained by, e.g., integrating high-frequency components in a predetermined area in the image data indicated by the area information. Moreover, the AF processing unit 117 also has a function as a determination unit and an in-focus position calculation unit, calculates an interpolation curve that is used for obtaining a true peak position of the AF evaluation values by evaluating a change in the AF evaluation values, and transmits data indicative of a focus lens position (focus position data) associated with a peak position of this interpolation curve to the system controller 105 as an in-focus position. It is to be noted that the system controller 105 or the like may be configured to have some or all of the functions of the AF processing unit 117.

An imaging method using the imaging apparatus according to this embodiment will now be described. A flowchart depicted in FIG. 2 shows an extracted operation of automatic focus adjustment (AF) in an operation flowchart of the imaging apparatus. As operations other than the AF operation, operations of a conventional imaging apparatus can be applied.

When the camera is activated by, e.g., depressing a power supply button, an operation of the flowchart in FIG. 2 is started. The system controller 105 determines, e.g., whether the shutter button has been half-depressed as a trigger that commences focusing (S201). When it is determined that the shutter button has not been half-depressed at S201, the system controller 105 stands by while performing the determination of S201. In this case, the AF operation is in a standby mode. A through image may be displayed during this standby mode of the AF operation.

When it is determined that the shutter button has been half-depressed at the S201, the system controller 105 sets exposure conditions for effecting the AF operation by the AE processing unit 116 (S202). At this time, the system controller 105 operates the imaging element 106 and fetches image data into the memory 115. The AE processing unit 116 calculates subject luminance from the image data written in the memory 115. Further, the AE processing unit 116 calculates, from the calculated subject luminance, exposure conditions such as an exposure time (a shutter speed) of the imaging element 106, a diameter of the diaphragm 103 (an aperture), and others that appropriately adjust exposure of the image data and transmits the calculated exposure conditions to the system controller 105. Moreover, although the subject luminance is calculated from the image data written in the memory 115 in this embodiment, the image data after A/D conversion may be directly input to the AE processing unit and the subject luminance may be calculated.

After setting the exposure conditions, the system controller 105 controls the lens drive unit 102 and starts driving the focus lens 101 (S203). Furthermore, the system controller 105 controls the imaging element drive unit 114 and starts driving the imaging element 106 under the exposure conditions set at S202. Here, in this embodiment, the image signal obtained by the imaging element 106 is read out based on the interlace system.

After start of driving the focus lens 101 and the imaging element 106, the system controller 105 uses the AF processing unit 117 to calculate an AF evaluation value in accordance with each field (S204). The AF evaluation value calculated by the AF processing unit 117 is stored in the memory 115. As described above, in this embodiment, the AF evaluation values corresponding to at least four fields including a current field are stored in the memory 115. In this embodiment, although each AF evaluation value is calculated from the image data written in the memory 115, the image data after A/D conversion may be directly input to the AF processing unit 117 to perform this calculation.

Then, the system controller 105 determines whether discrimination of a direction has been completed by the AF processing unit 117 (S205). The discrimination of a direction is processing for determining whether a drive direction for the focus lens is correct, i.e., whether the focus lens 101 is driven in a direction along which each AF evaluation value increases.

When it is determined that the discrimination of a direction has not been completed at S205, the system controller 105 allows the AF processing unit 117 to execute direction discrimination processing (S206).

Figure 3:
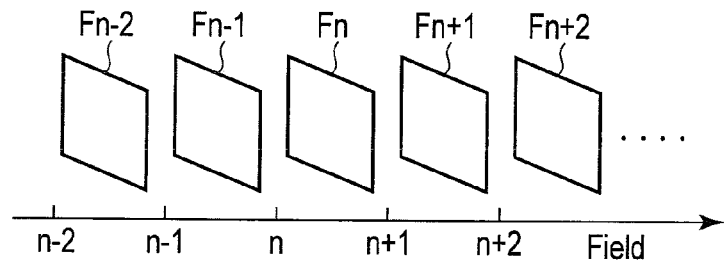
FIG. 3 is a view for explaining direction discrimination.

To read an image signal based on the interlace system, the discrimination of a direction is performed with use of an added value of AF evaluation values in fields adjacent to each other. An example of two-field reading will now be described. As explained above, the two-field reading is a read system that divides one frame of an image into two fields, i.e., an Odd field and an Even field, reads out an image signal from each pixel in odd-numbered rows of the imaging element 106 in the Odd field, and reads out an image signal from each pixel in even-numbered rows of the imaging element 106 in the Even field. First, during the contrast AF, as shown in FIG. 3, image data is acquired in chronological order. Here, image data in a field (a current field) where the discrimination of a direction is performed is assumed to be Fn, and an AF evaluation value calculated from the image data in this Fn field is defined as Cn. In the case of the two-field reading, AF evaluation values in three fields including the current field are used to perform the discrimination of a direction. Specifically, in the AF evaluation values in these three fields, added values of the AF evaluation values in respective two fields adjacent to each other are calculated, and the added values are compared with each other in regard to a magnitude relation. Assuming that $S_n$ is an added value obtained in an $F_n$ field and $S_{n-1}$ is an added value obtained in an $F_{n-1}$ field, $S_n$ and $S_{n-1}$ are given as follows, respectively.

$$S_n = C_n + C_{n-1}$$

$$S_{n-1} = C_{n-1} + C_{n-2}$$

When these added values $S_n$ and $S_{n-1}$ are compared with each other in regard to the magnitude relation and $S_{n-1} < S_n$ is achieved, it is determined that the AF evaluation values increase, i.e., the direction to be driven for the focus lens 101 coincides with the current direction. On the other hand, when $S_{n-1} > S_n$ is achieved, it is determined that the AF evaluation values decrease, i.e., the direction to be driven for the focus lens 101 is opposite to the current direction. In this case, in a subsequent field, the drive direction for the focus lens 101 is reversed. When the drive direction has been once determined to be correct, the discrimination of a direction does not have to be carried out thereafter. It is needless to say that the discrimination of a direction may be performed in accordance with each field.

When it is determined that the discrimination of a direction has been completed at S205, the system controller 105 allows the AF processing unit 117 to execute peak position detection processing (S207). In the peak detection processing, a peak position of the AF evaluation values is detected while moving the focus lens 101 in the drive direction discriminated at S206. Particulars of the peak position detection processing will be described later. Here, the peak position means a position of the focus lens 101 associated with a peak value of the AF evaluation values. In this contrast AF, the peak position can be considered as an in-focus position.

After the direction discrimination processing at S206 or the peak detection processing at S207, the system controller 105 determines whether the peak position detection has been normally performed (S208). At S208, whether the peak position of the AF evaluation values has been detected by the peak detection processing and whether the detected peak position meets required conditions are determined.

When it is determined that the peak position has not been detected or when it is determined that the detected peak position does not meet the required conditions at S208, the system controller 105 returns the processing to S204. In other words, the system controller 105 repeats loop processing of S204 to S208 until the peak position of the AF evaluation values is detected. It is to be noted that driving the focus lens 101 continues even during the processing of S204 to S208, and calculation of the AF evaluation value in each field or detection of the peak position is repeated until the peak position is detected.

Further, when it is determined that the peak position has been detected at S208, the system controller 105 controls the lens drive unit 102 and moves the focus lens 101 to a focus lens position associated with the peak position transmitted from the AF processing unit 117 (S209). Then, the system controller 105 terminates the operation of the flowchart in FIG. 2. Thereafter, a photographing operation is executed in response to full depression of the shutter button affected by a user.

Figure 4:
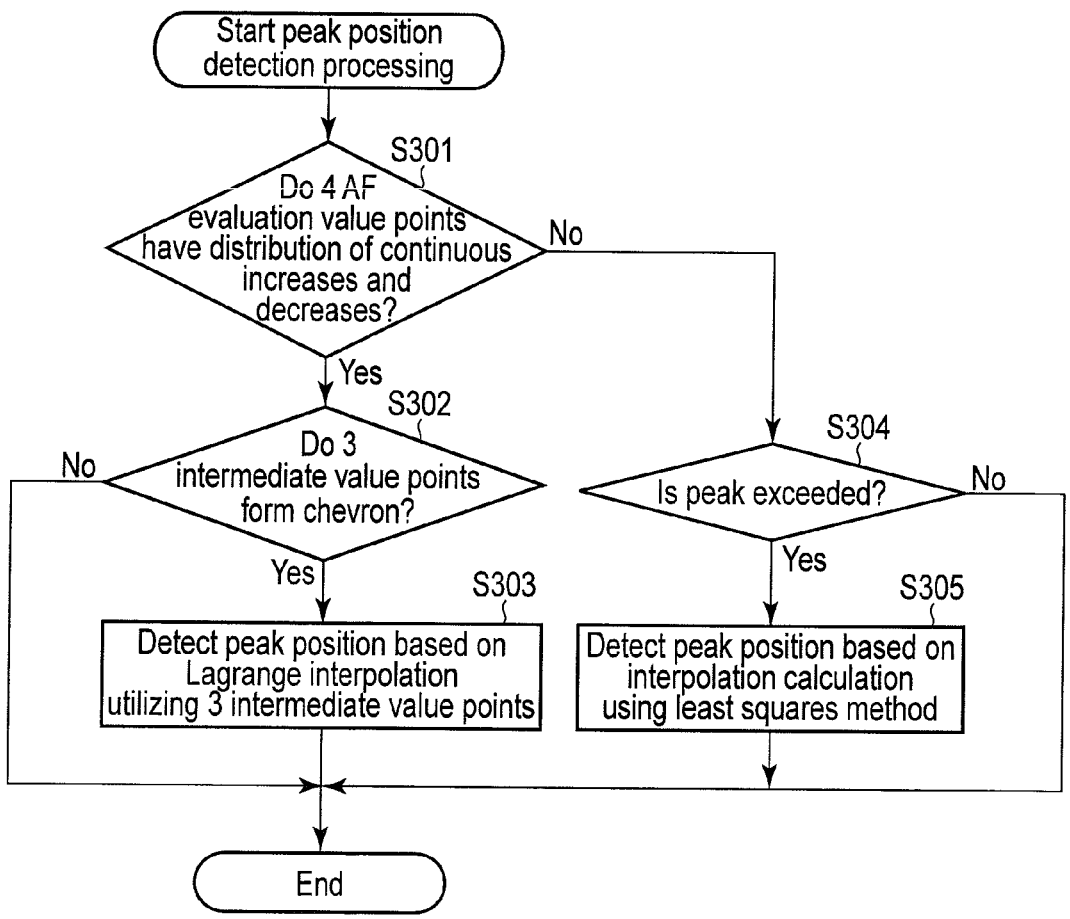
FIG. 4 is a flowchart showing peak position detection processing.

Particulars of the peak position detecting processing will now be described with reference to a flowchart depicted in FIG. 4. The peak position detection processing in the case of the interlace system for the two-field reading will be explained here. The AF processing unit 117 determines whether the AF evaluation values in the past three fields have a distribution of continuous increases and decreases when the current field is a reference (S301).

Figure 5:
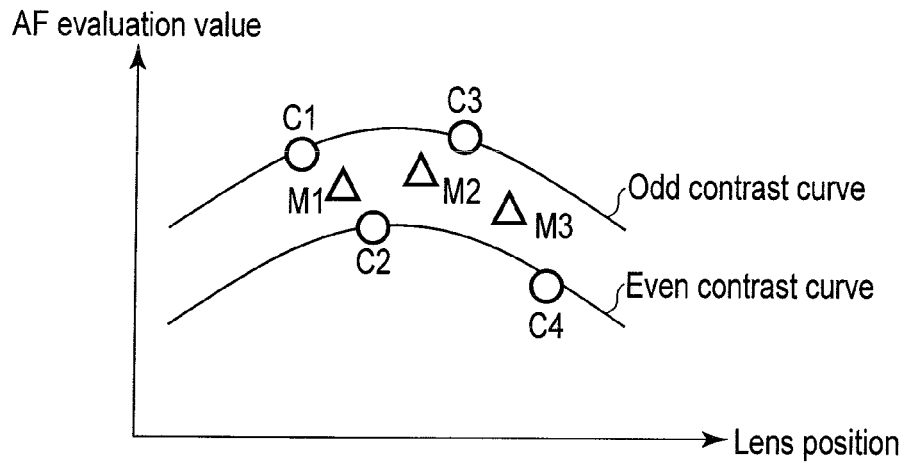
FIG. 5 is a view for explaining a determination on a jagged shape.
Figure 6:
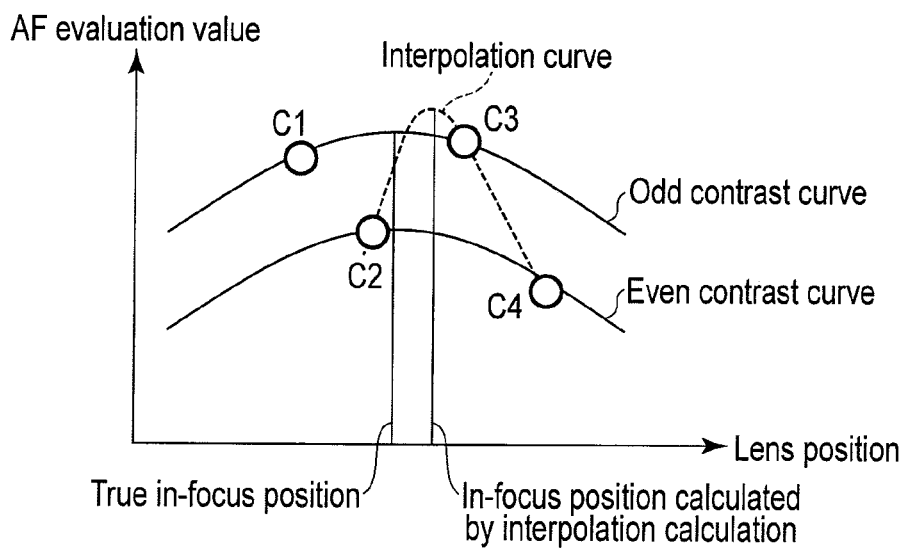
FIG. 6 is a view for explaining conventional peak position detection.

A distribution of continuous increases and decreases means a shape such that AF evaluation values Cn (n=1, 2, 3, 4) in four fields are aligned in a zigzag pattern (increases and decreases are repeated) with respect to changes in position of the focus lens as shown in FIG. 5. When the contrast of a subject greatly defers depending on the Odd field and the Even field, the AF evaluation values are apt to have the distribution of continuous increases and decreases.

Whether the AF evaluation values have the distribution of continuous increases and decreases is determined by comparing the AF evaluation values in regard to a magnitude relation. Specifically, whether each of two continuous AF evaluation values has a relation that its both adjoining AF evaluation values are small or large is determined, and whether the AF evaluation values have the distribution of continuous increases and decreases is determined by determining whether the relation that both the AF evaluation values are small or large holds. More specifically, when one of the following conditions is met, it is determined that the AF evaluation values have the distribution of continuous increases and decreases.

$C1 > C2, C2 < C3,$ and $C3 > C4$ or $C1 < C2, C2 > C3,$ and $C3 < C4$

When it is determined that the AF evaluation values have the distribution of continuous increases and decreases at S301, the AF processing unit 117 calculates an intermediate value (or an average value) of the AF evaluation values of two adjacent fields in the AF evaluation values of the four fields. FIG. 5 shows that M1 is an intermediate value of the AF evaluation values C1 and C2, M2 is an intermediate value of the AF evaluation values C2 and C3, and M3 is an intermediate value of the AF evaluation values C3 and C4. After calculating each intermediate value, the AF processing unit 117 determines whether the three intermediate value points form a "chevron" (S302).

The "chevron" shape means a shape such that the intermediate values Mn (n=1, 2, 3) in three fields are aligned in a mountain-like shape (corresponding to an increase and decrease) in response to changes in position of the focus lens as shown in FIG. 5.

Whether a change in intermediate value is a change in chevron is determined by comparing the intermediate values in regard to a magnitude relation. Specifically, when the following conditions are met, it is determined that the change in intermediate value is the change in chevron.

M1<M2 and M2>M3

When it is determined that the three intermediate value points form the chevron at S302, it is determined that a peak position of the AF evaluation values is present among the three intermediate value points. In this case, the AF processing unit 117 performs a first interpolation calculation with use of the three intermediate value points and detects the peak value (S303). Thereafter, the AF processing unit 117 terminates the peak position detection processing. Here, as the first interpolation calculation performed at S303, for example, Lagrange interpolation is used. The Lagrange interpolation is an interpolation method for obtaining an interpolation curve running through given points by a calculation. In general, to obtain an mth-order interpolation curve by Lagrange interpolation, (m+1) points are required. For example, in the case of three points, a second-order interpolation curve running through these three points is calculated by Lagrange interpolation. In general, a distribution of AF evaluation values can be substantially approximated as a parabola near a peak position. Therefore, as the interpolation calculation, using Lagrange interpolation is effective.

Further, when it is determined that the AF evaluation values do not have the distribution of continuous increases and decreases at S301, the AF processing unit 117 determines whether the AF evaluation values exceed the peak position (S304). Here, whether the latest AF evaluation value (C4 in the example of FIG. 5) is reduced by a predetermined amount as compared with a maximum value of the AF evaluation values is determined. When this value is not reduced, it is determined that the peak position is not exceeded. Furthermore, when this value is reduced, it is determined that the peak position is exceeded.

When it is determined that the three intermediate value points do not form the chevron at S302 or when the AF evaluation values do not exceed the peak position at S304, the AF processing unit 117 terminates the peak position detection processing. In this case, since the current focus lens position is not an in-focus position, the peak position detection processing is again executed at a subsequent focus lens position.

Moreover, when it is determined that the AF evaluation values exceed the peak value at S304, the AF processing unit 117 performs a second interpolation calculation by using the AF evaluation values in the four fields and detects the peak position (S305). Then, the AF processing unit 117 terminates the peak position detection processing. Here, as the second interpolation calculation at S305, for example, a least squares method is used. The interpolation using the least squares method is an interpolation method that obtains an interpolation curve that allows a difference square-sum relative to given points to become minimum by a calculation.

As described above, in this embodiment, in the case of reading out each image signal based on the interlace system and carrying out the contrast AF, a distribution of AF evaluation values in continuous fields including a current field is determined. In the case of reading out each image signal based on the interlace system, how an AF evaluation value varies may greatly differ depending on each field. In this embodiment, a situation where AF evaluation values have a distribution of continuous increases and decreases is determined, and the interpolation calculation suitable for the distribution of continuous increases and decreases is executed. Specifically, when AF evaluation values have a distribution of continuous increases and decreases, an intermediate value (or an average value) of the AF evaluation values in fields adjacent to each other is acquired, and an interpolation curve of this intermediate value is obtained. When the focus lens 101 is stopped at a lens position associated with a peak position of the intermediate value, an average blur amount of one frame can be minimized.

As a result, even in the case of detecting an in-focus position by using each image signal taken based on the interlace system, an AF accuracy is not lowered. Further, when a true in-focus position is detected by the interpolation calculation, the AF accuracy does not decrease even if a drive speed of the focus lens increases. Therefore, high-speed contrast AF can be executed.

Furthermore, when the AF evaluation values do not have the distribution of continuous increases and decreases, the peak position is detected without using the intermediate value. Therefore, the contrast AF can be carried out at a high speed as compared with a case where the peak position is detected by constantly using the intermediate value.

Moreover, in the above-described embodiment, the distribution of the AF evaluation values in the four fields including the current field is determined. However, when four or more fields are present, a determination can be made. In this regard, at the time of obtaining an interpolation curve, using AF evaluation values at three points near a true peak position is desirable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    a lens drive unit configured to drive a focus lens;
    an imaging element configured to image a subject through the focus lens to obtain an image signal;
    an evaluation value calculation unit configured to read out the image signal obtained by the imaging element based on an interlace system and to calculate an AF evaluation value from the image signal in each field read out based on the interlace system;
    a determination unit configured to determine whether the continuous AF evaluation values have a distribution of continuous increases and decreases;

an in-focus position calculation unit configured to perform a first interpolation calculation for obtaining an interpolation curve from an intermediate value of the AF evaluation values adjacent to each other and calculating an in-focus position when the AF evaluation values are determined to have the distribution of continuous increases and decreases, and performs a second interpolation calculation for obtaining an interpolation curve of the AF evaluation value and calculating an in-focus position when the AF evaluation values are determined to not have the distribution of continuous increases and decreases; and a control unit configured to control the lens drive unit to drive the focus lens to the in-focus position.

2. The apparatus according to claim 1,
wherein the determination unit determines whether each of the two continuous the AF evaluation values has a relation that both the adjoining AF evaluation values are small or large, and determines whether the AF evaluation values have the distribution of continuous increases and decreases by determining whether both the two AF evaluation values have the relation.

3. The apparatus according to claim 1,
wherein the determination unit determines whether the AF evaluation values have the distribution of continuous increases and decreases by determining whether the continuous AF evaluation values $C1$ to $C4$ meet $C1>C2$, $C2<C3$, and $C3>C4$ or meet $C1<C2$, $C2>C3$, and $C3<C4$.

4. The apparatus according to claim 1,
wherein, when the AF evaluation values are determined to have the distribution of continuous increases and decreases and a distribution shape of the intermediate value is a chevron, the in-focus position calculation unit obtains an interpolation curve of the intermediate value by the first interpolation calculation and calculates an in-focus position.

5. The apparatus according to claim 1,
wherein the first interpolation calculation is Lagrange interpolation, and the second interpolation calculation is interpolation using a least squares method.

6. An imaging method comprising:
using a lens drive unit to drive a focus lens;
using an imaging element to image a subject through the focus lens to obtain an image signal;
using an evaluation value calculation unit to read out the image signal obtained by the imaging element based on an interlace system and calculate an AF evaluation value from the image signal in each field read out based on the interlace;
using a determination unit to determine whether the continuous AF evaluation values have a distribution of continuous increases and decreases;
using an in-focus position calculation unit to perform a first interpolation calculation for obtaining an interpolation curve from an intermediate value of the AF evaluation values adjacent to each other and calculating an in-focus position when the AF evaluation values are determined to have the distribution of continuous increases and decreases, and to perform a second interpolation calculation for obtaining an interpolation curve of the AF evaluation values and calculating an in-focus position when the AF evaluation values are determined to not have the distribution; and
using a control unit to control the lens drive unit to drive the focus lens to the in-focus position.

* * * * *